US007543657B2

(12) United States Patent
Friggstad

(10) Patent No.: US 7,543,657 B2
(45) Date of Patent: Jun. 9, 2009

(54) TILLAGE APPARATUS HAVING FLEXIBLE FRAME AND WEIGHT DISTRIBUTION SYSTEM

(75) Inventor: Terrance A. Friggstad, Grasswood (CA)

(73) Assignee: CNH Canada, Ltd. (CN)

( * ) Notice: Subject to any disclaimer, the term of this patent is extended or adjusted under 35 U.S.C. 154(b) by 480 days.

(21) Appl. No.: 10/925,569

(22) Filed: Aug. 25, 2004

(65) Prior Publication Data
US 2006/0042806 A1 Mar. 2, 2006

(51) Int. Cl.
A01B 49/00 (2006.01)
(52) U.S. Cl. ...................... 172/310; 172/682
(58) Field of Classification Search ................. 172/311, 172/139, 165, 166, 174, 175, 178, 538, 599, 172/682, 349, 743; 111/52, 53, 54, 55, 926
See application file for complete search history.

(56) References Cited

U.S. PATENT DOCUMENTS

| 805,252 | A | * | 11/1905 | Winters ........................ 172/349 |
| 1,047,564 | A | * | 12/1912 | Raybourn et al. ............ 172/333 |
| 2,323,044 | A | | 6/1943 | Hyland |
| 2,643,623 | A | * | 6/1953 | Soss ............................. 111/61 |
| 2,755,720 | A | * | 7/1956 | Markel ........................ 172/466 |
| 2,796,817 | A | | 6/1957 | Altgelt |
| 2,822,738 | A | | 2/1958 | Smith |
| 3,209,840 | A | * | 10/1965 | Lehman ....................... 172/584 |
| 3,516,497 | A | | 6/1970 | Waterson |
| 3,592,271 | A | * | 7/1971 | Schneider .................... 172/175 |
| 3,736,988 | A | | 6/1973 | Cantral et al. |
| 3,747,422 | A | | 7/1973 | Rikli |
| 3,986,464 | A | | 10/1976 | Uppiano |
| 4,356,780 | A | | 11/1982 | Bauman |
| 4,415,174 | A | | 11/1983 | Koehn |
| 4,519,460 | A | | 5/1985 | Gust |
| 4,561,797 | A | | 12/1985 | Aldridge |
| 4,660,651 | A | | 4/1987 | Pfenninger et al. |
| 5,181,573 | A | * | 1/1993 | Almen ........................ 172/459 |
| 5,669,452 | A | * | 9/1997 | Wright et al. ................ 172/685 |
| 5,988,293 | A | * | 11/1999 | Brueggen et al. ............ 172/414 |
| 6,068,062 | A | * | 5/2000 | Brueggen et al. ............ 172/311 |
| 6,125,775 | A | | 10/2000 | Gust |
| 6,336,511 | B1 | * | 1/2002 | Friggstad .................... 172/311 |
| 6,382,326 | B1 | | 5/2002 | Goins et al. |
| 6,401,832 | B1 | | 6/2002 | Payne et al. |
| 6,758,284 | B2 | * | 7/2004 | Myers ......................... 172/311 |
| 2001/0011595 | A1 | * | 8/2001 | Friggstad .................... 172/311 |

* cited by examiner

Primary Examiner—Thomas B Will
Assistant Examiner—Jamie L McGowan
(74) Attorney, Agent, or Firm—Rebecca Henkel

(57) ABSTRACT

A tillage apparatus including a frame having tillers, land wheels supporting the frame, and press wheels on the frame is disclosed. In one form, the frame has a forward section and a rearward section supporting the press wheels. The rearward section can pivot radially with respect to the direction of movement of the forward section. In another form, the frame includes a linkage assembly connected to the rearward section. An inner wheel support gang having press wheels is attached to a pivoting mounting bracket of the linkage assembly such that the inner wheel support gang can pivot vertically. In another form, the apparatus includes a weight transfer device including a linkage connecting a boom and the forward section. A biasing means pivotally connected to the forward section and to the linkage distributes weight from the boom to the forward section to the rearward section and to the press wheels.

13 Claims, 8 Drawing Sheets

_US 7,543,657 B2_

TILLAGE APPARATUS HAVING FLEXIBLE FRAME AND WEIGHT DISTRIBUTION SYSTEM

CROSS-REFERENCES TO RELATED APPLICATIONS

Not Applicable.

STATEMENT REGARDING FEDERALLY SPONSORED RESEARCH

Not Applicable.

BACKGROUND OF THE INVENTION

1. Field of the Invention

The present invention relates to an agricultural tillage apparatus including rear press wheels, and more particularly, the invention pertains to an agricultural tillage apparatus that provides improved frame flexibility such that the rear press wheels can more closely follow the contours of the ground, that provides improved weight distribution for the rear press wheels, and that provides adjustable weight transfer to the rear press wheels.

2. Description of the Related Art

Typical agricultural seeders are wheeled implements which are towed by agricultural work vehicles such as tractors. A seeder has a frame structure which has containers for seeds and a number of seed insertion devices such as shank type seed drills. The seed drills are arranged in horizontal rows to provide uniform application of the seeds in rows in the soil. The seeder frame structure is supported by a number of wheels. Typically the frame structure has a number of front land wheels and rear press wheels. The rear press wheels stabilize the seeder and compact the soil over the planted seeds. Compaction immediately after planting is very beneficial to crop yields. When soil is packed around the newly-planted seed, moisture is retained in the soil by expelling the air in the soil. As a result, the seed does not dry out and can draw water up for growth.

Various seeding and/or compaction devices for packing the soil after tilling are known in the prior art. In these devices, separate land wheels are provided to support the implement (including the drills and rear press wheels) when raised for turning or transport to a different location. In operation, the drills and press wheels are lowered so that the rear press wheels track a path behind the drills to compact the soil.

Some known seeding and/or compaction devices suffer from uneven weight distribution on the land wheels and rear press wheels. This can cause seed insertion which is uneven and/or deeper or shallower than desired, and uneven soil compaction in seeded areas. U.S. Pat. No. 6,125,778 has proposed one solution to this problem by providing a seeder with a weight distribution system such that weight on the front wheels is distributed to the work vehicle via the tow hitch and the rear wheels.

Some known seeding and/or compaction devices are also disadvantageous in that the rear press wheels are unable to independently follow the contours of the ground. This can result in uneven compaction in tilled areas. U.S. Pat. No. 4,519,460 has proposed one solution to this problem by providing a tillage implement in which the rear press wheels are able to independently follow the contours of the ground.

While solutions has been proposed to the problems associated with uneven seed insertion and uneven soil compaction, there still exists a need for an improved agricultural tillage apparatus that provides rear press wheels that can more closely follow the contours of the ground, that provides improved weight distribution for the rear press wheels, and that provides adjustable weight transfer to the rear press wheels.

SUMMARY OF THE INVENTION

The foregoing needs are met by a tillage apparatus according to the invention. The tillage apparatus includes a flexible frame such that rear press wheels can more closely follow the contours of the ground thereby providing more even seed insertion and soil compaction. The tillage apparatus also provides improved weight distribution for the rear press wheels thereby providing more even seed insertion and soil compaction. In addition, the tillage apparatus provides adjustable weight transfer to the rear press wheels thereby providing more even seed insertion and soil compaction.

In one aspect, the tillage apparatus includes a frame including a forward frame section having a plurality of tillers and a rearward frame section having a plurality of tillers, and at least two rotatable land wheels supporting the frame. At least one wheel support gang is attached to the rearward frame section, and a plurality of rotatable press wheels are suspended from each wheel support gang. The forward frame section has an axis in a direction of movement of the apparatus when tilling the field and the rearward frame section can pivot radially with respect to the axis of the forward frame section such that a pitch of the forward frame section follows a contour of the field encountered by the land wheels and a pitch of the rearward frame section follows a contour of the field encountered by the press wheels when the tilling the field. Thus, the pitch of the forward frame section is controlled by land wheels and the pitch of the rearward frame section is controlled by press wheels. The flexible frame is provided so that rear press wheels can more closely follow the contours of the ground thereby providing more even seed insertion and soil compaction.

A crossbar may be attached to the rearward frame section. The crossbar has an axis in a direction of movement of the apparatus when tilling the field. Each wheel support gang may be pivotally attached to the crossbar such that each wheel support gang can pivot radially with respect to the axis of the crossbar. The apparatus may include two outermost wheel support gangs attached to the crossbar with each of the outermost wheel support gangs having a plurality of rotatable press wheels suspended therefrom. In this arrangement, the pitch of the rearward frame section follows a contour of the field encountered by the press wheels of the outermost wheel support gangs when tiling the field. The apparatus may further include at least one inner wheel support gang attached to the crossbar between the outermost support gangs with each inner wheel support gang having a plurality of rotatable press wheels suspended therefrom.

The frame may include a boom. The forward frame section can be mounted to the boom and the land wheels can be mounted under the boom. A rockshaft may be pivotally mounted to the boom with the forward frame section being attached to the rockshaft. The forward frame section may be attached to the rearward frame section, and an actuator may be connected to the rockshaft and the forward frame section such that movement of the actuator rotates the rockshaft thereby causing a vertical elevation change in the forward frame section and the rearward frame section.

The apparatus may include land wheels, a central portion, a left wing portion pivotally mounted on the central portion, and a right wing portion pivotally mounted on the central portion. Both the left wing portion and the right wing portion may include one or more forward frame sections having a plurality of tillers and one or more rearward frame sections having a plurality of tillers. One or more wheel support gangs is attached to each rearward frame section, and a plurality of rotatable press wheels are suspended from each wheel support gang. A pitch of each forward frame section follows a contour of the field encountered by the land wheels when the tilling the field, and a pitch of each rearward frame section follows a contour of the field encountered by the press wheels mounted on each wheel support gang attached to the rearward frame section when tilling the field.

In another aspect, the tillage apparatus includes a frame including a rearward frame section having a plurality of tillers. A crossbar is attached to the rearward frame section, and the crossbar has an axis in a direction of movement of the apparatus when tilling the field. An outermost wheel support gang is attached to the crossbar such that the outermost wheel support gang can pivot radially with respect to the axis of the crossbar. Rotatable press wheels are suspended from the outermost wheel support gang. A linkage assembly is connected to the rearward frame section and to the crossbar inward from the outermost wheel support gang. An inner wheel support gang is attached to a pivoting mounting bracket of the linkage assembly such that the inner wheel support gang can pivot radially with respect to the axis of the crossbar and can pivot in the direction of the axis of the crossbar. A plurality of rotatable press wheels are suspended from the inner wheel support gang. When the apparatus is pulled across the field during tilling, the press wheels of the outermost wheel support gang follow a contour of the field and the inner wheel support gang pivots radially with respect to the axis of the crossbar and pivots away or toward the direction of the axis of the crossbar such that the press wheels of the inner wheel support gang follow a contour of the field. Thus, the tillage apparatus provides improved weight distribution for the rear press wheels thereby providing more even seed insertion and soil compaction.

The linkage assembly may include a compression strut connected to the mounting bracket and the rearward frame section, and the linkage assembly may include a frame arm connected to the mounting bracket below the compression strut and connected to the rearward frame section. As a result, pivoting of the mounting bracket toward the direction of the axis of the crossbar vertically raises the inner wheel support gang and vertically lowers the outermost wheel support gang and pivoting of the mounting bracket away from the direction of the axis of the crossbar vertically lowers the inner wheel support gang and vertically raises the outermost wheel support gang.

A second outermost wheel support gang may also be attached to the crossbar such that the second outermost wheel support gang can pivot radially with respect to the axis of the crossbar. The second outermost wheel support gang is positioned on the crossbar on a side of the inner wheel support gang opposite the outermost wheel support gang, and a plurality of rotatable press wheels are suspended from the second outermost wheel support gang. The press wheels of the second outermost wheel support gang follow a contour of the field when the apparatus is pulled across the field. A pitch of the rearward frame section can also follow the contour of the field encountered by the press wheels of the outermost wheel support gang and the press wheels of the second outermost wheel support gang when the apparatus is pulled across the field. Thus, a mechanism is provided whereby the weight of the frame and the tillers can be applied to three press wheel gangs in even and proportionate amounts while allowing the center inner press wheel gang to change elevation independent of the outermost gangs.

Pivoting of the mounting bracket toward the direction of the axis of the crossbar vertically raises the inner wheel support gang and vertically lowers the outermost wheel support gang and the second outermost wheel support gang and pivoting of the mounting bracket away from the direction of the axis of the crossbar vertically lowers the inner wheel support gang and vertically raises the outermost wheel support gang and the second outermost wheel support gang.

The mounting bracket may include means for adjusting the spacing between a junction of the compression strut and the mounting bracket and a junction of the frame arm and the mounting bracket thereby adjusting distribution of loads on the inner wheel support gang and the outermost wheel support gang and the second outermost wheel support gang when the apparatus is pulled across the field.

In yet another aspect, the tillage apparatus includes a frame having a boom, a plurality of tillers, a forward frame section, and a rearward frame section connected to the forward frame section. At least one wheel support gang is attached to the rearward frame section, and rotatable press wheels are suspended from each wheel support gang. The apparatus includes a weight transfer device including a linkage connecting the boom and the forward frame section. The weight transfer device includes biasing means pivotally connected to the forward frame section and to the linkage. The biasing means distributes weight from the boom to the forward frame section to the rearward frame section and to the press wheels by applying a downward force on the linkage. The forward frame section can be moved from a raised position in which the biasing means does not apply a downward force on the linkage to a lower working position in which the biasing means applies a downward force on the linkage.

In one form, the biasing means includes a pivoting bolt connected to the forward frame section and a spring positioned over the bolt between an upper end plate connected to the bolt and a pin attached to the linkage such that the spring applies the downward force on the linkage. The biasing means may further comprise means for adjusting a position of the upper end plate with respect to the pin attached to the linkage such that the downward force can be varied by varying a length of the spring.

The linkage may include a first link pivotally connected to the boom and a second link pivotally connected to the first link and the forward frame section wherein the biasing means is pivotally connected to the second link. The linkage may further include means for adjusting the position of the second link with respect to the forward frame section such that the downward force can be varied.

Thus, a mechanism is provided whereby the weight of the front boom can be adjustably transferred to rear press wheels by creating torsional force about their connecting pivot.

These and other features, aspects, and advantages of the present invention will become better understood upon consideration of the following detailed description, drawings, and appended claims.

BRIEF DESCRIPTION OF THE DRAWINGS

Like reference numerals are used to depict like parts throughout the Figures.

DETAILED DESCRIPTION OF THE INVENTION

Figure 1:
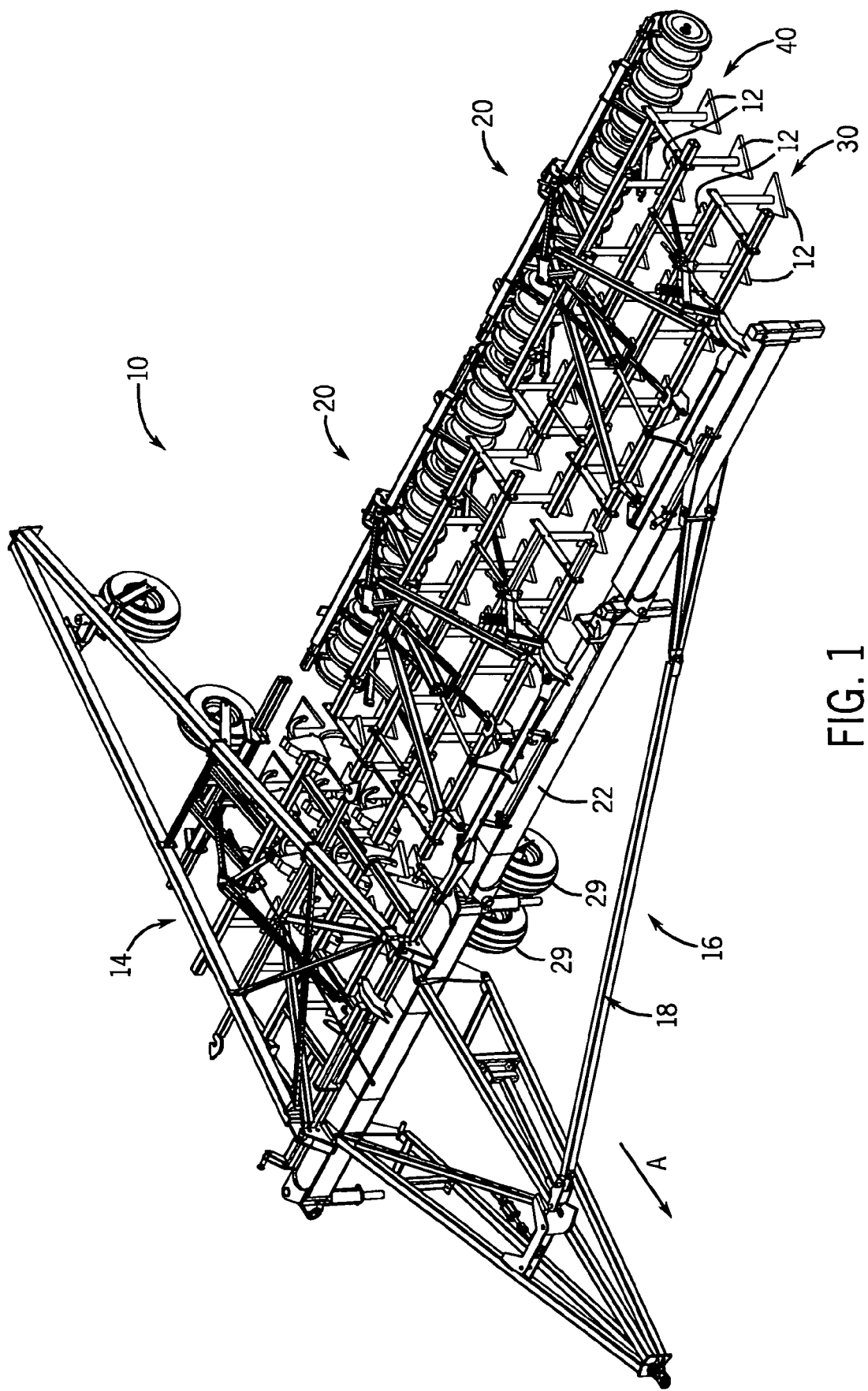
FIG. 1 is a top front perspective view of a tillage apparatus according to the invention with the right wing portion omitted.

Looking at FIG. 1, there is shown a shank type seed drill apparatus 10 having a central portion 14 and having a left wing portion 16 having two frames 20. The apparatus 10 has a right wing portion (not shown) that is a mirror image of the left wing portion 16. The left wing portion 16 may be upwardly folded for transport using arm 18. Likewise, the right wing portion may be upwardly folded for transport. Each frame 20 includes a forward frame section 30 with tillers 12 and a rearward frame section 40 with tillers 12. The apparatus 10 is connected to a tractor in a conventional manner and has an axis A in a direction of movement of the apparatus 10 when tilling a field.

Figure 2:
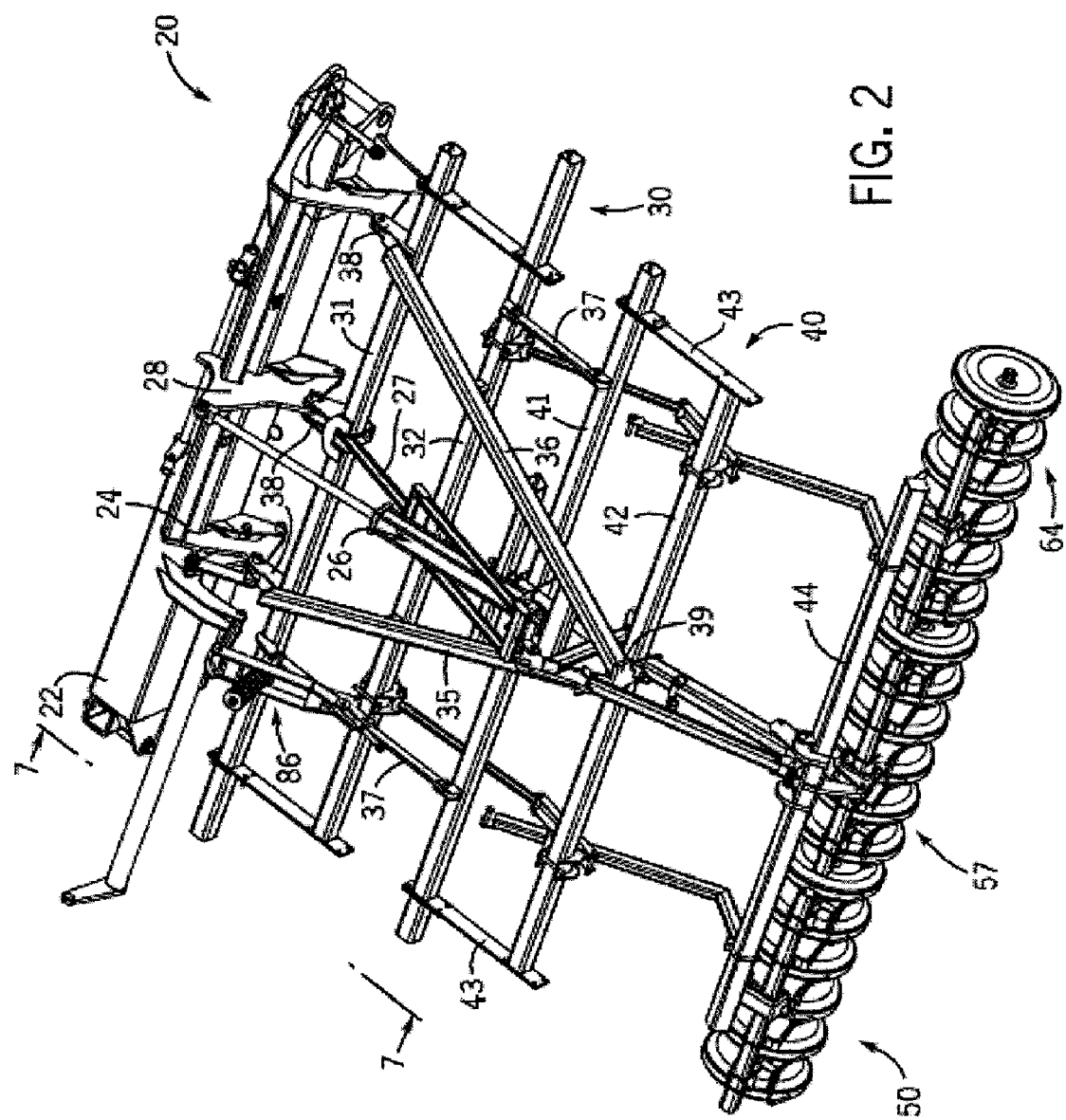
FIG. 2 is a top rear perspective view of one frame section of the tillage apparatus of FIG. 1.
Figure 3:
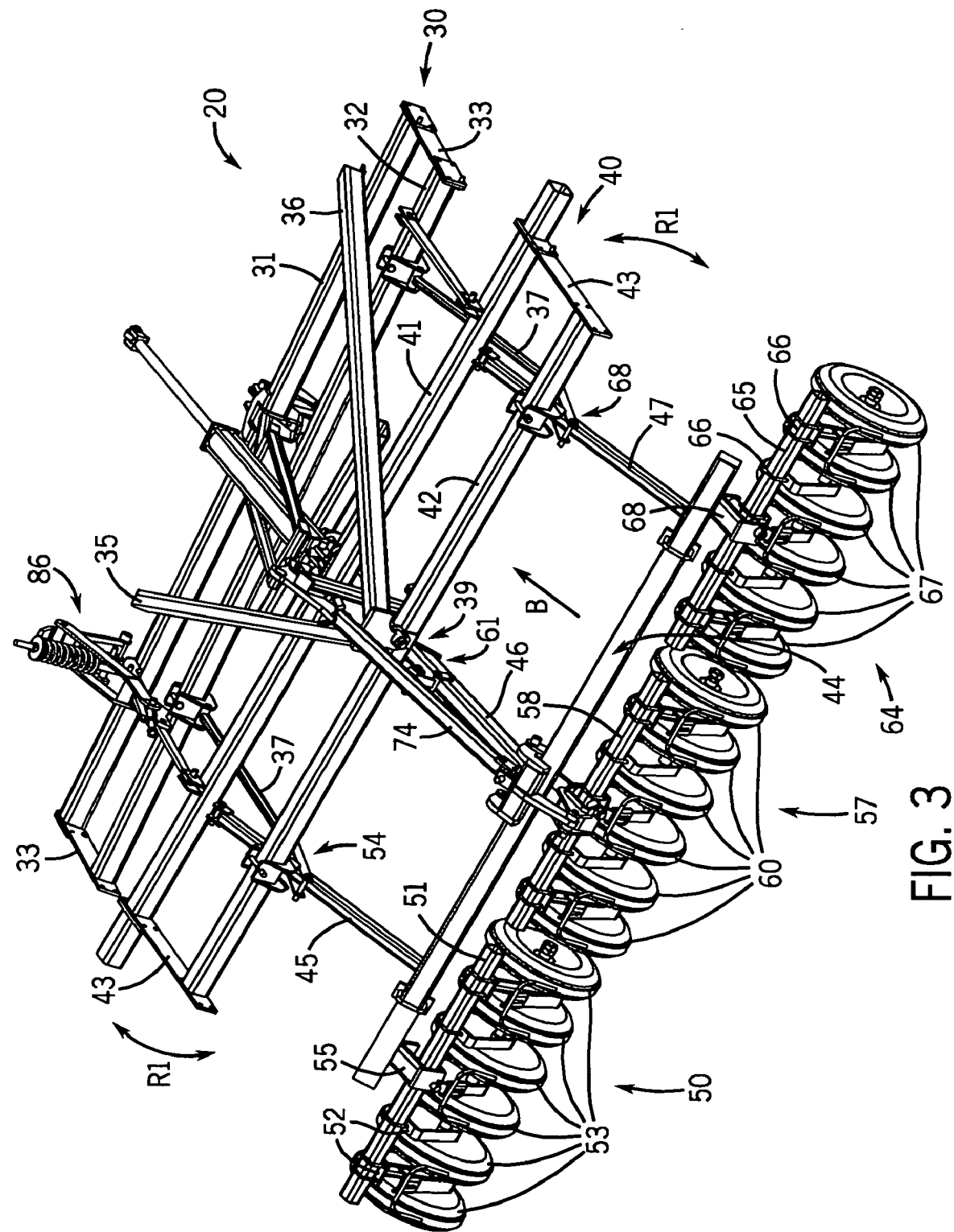
FIG. 3 is a top rear perspective view of the frame section of FIG. 2 with the rearward frame section radially pivoted with respect to the forward frame section.

In FIGS. 2 and 3, there is shown one frame 20 of the apparatus 10, with the tillers removed for clarity. The forward frame section 30 includes a front transverse tube 31 and a rear transverse tube 32 connected by supports 33. Angled frame members 35 and 36 are connected to the top of the front transverse tube 31 and the rear transverse tube 32 to form the forward frame section 30.

The forward frame section 30 also features lugs 38 at the front end for mounting to a rockshaft 24, which in turn is mounted to boom 22, so that motion of a hydraulic cylinder 26 rotates the rockshaft 24 resulting in vertical elevation change of the frame 20. A link 27 is attached to a lever 28 on the rockshaft 24 to translate motion of press wheel gangs 50, 57, 64 at rear (which are described below) so this vertical motion is parallel with the ground and synchronized front to rear. A journal 39 at the rear of the triangle formed by the forward frame section 30 is oriented horizontally and parallel to the direction of travel. The mount for the hydraulic cylinder actuator 26 is positioned near the vortex of the triangle.

The rearward frame section 40 includes a front transverse tube 41 and a rear transverse tube 42 connected by supports 43. It can be seen that the front transverse tube 31, the rear transverse tube 32, the front transverse tube 41 and the rear transverse tube 42 are constructed in two sets to mount ground-working tools (such as tillers 12) in typical staggered configuration. The rearward frame section 40 attaches to the forward frame section 30 on the journal 39 so it can rotate relative to the forward frame section 30 in radial directions R1 (see FIG. 3) approximately 10 degrees in either direction.

Links 37 attach pivotally to lugs on both the forward frame section 30 and the rearward frame section 40. As the apparatus 10 is working, draft loads are carried through these links 37 as well as through the thrust surfaces of the connecting journal 39. The action of the forward frame section 30 and the rearward frame section 40 is not dependent on these links 37; they are present as a stabilizer and companion draft link.

Referring to FIG. 3, press wheel gangs 50, 57, 64 are connected to the rearward frame section 40 by crossbar 44 and bars 45, 46 and 47, which pivot about journals 54, 61, 68 on rear transverse tube 42, when actuated by the rockshaft 24. Crossbar 44 has an axis B in direction of movement of the apparatus in a field. As even contact with the soil is necessary for successful planting, a section of this size includes three separate press wheel gangs. Left outer press wheel gang 50 includes mounting arm 51 and press wheels 53 suspended from the mounting arm 51 by mounting brackets 52. Middle press wheel gang 57 includes mounting arm 58 and press wheels 60 suspended from the mounting arm 58 by mounting brackets 59. Right outer press wheel gang 64 includes mounting arm 65 and press wheels 67 suspended from the mounting arm 65 by mounting brackets 66.

Referring to FIG. 3, press wheel gangs 50, 57, 64 are connected to the rearward frame section 40 by crossbar 44 and bars 45, 46 and 47, which pivot about journals 54, 61, 68 on rear transverse tube 42, when actuated by the rockshaft 24. Crossbar 44 has an axis B in direction of movement of the apparatus in a field. As even contact with the soil is necessary for successful planting, a section of this size includes three separate press wheel gangs. Left outer press wheel gang 50 includes mounting arm 51 and press wheels 53 suspended from the mounting arm 51 by mounting brackets 52. Middle press wheel gang 57 includes mounting arm 58 and press wheels 60 suspended from the mounting arm 58 by mounting brackets 59. Right outer press wheel gang 64 includes mounting arm 65 and press wheels 67 suspended from the mounting arm 65 by mounting brackets 66.

Figure 4:
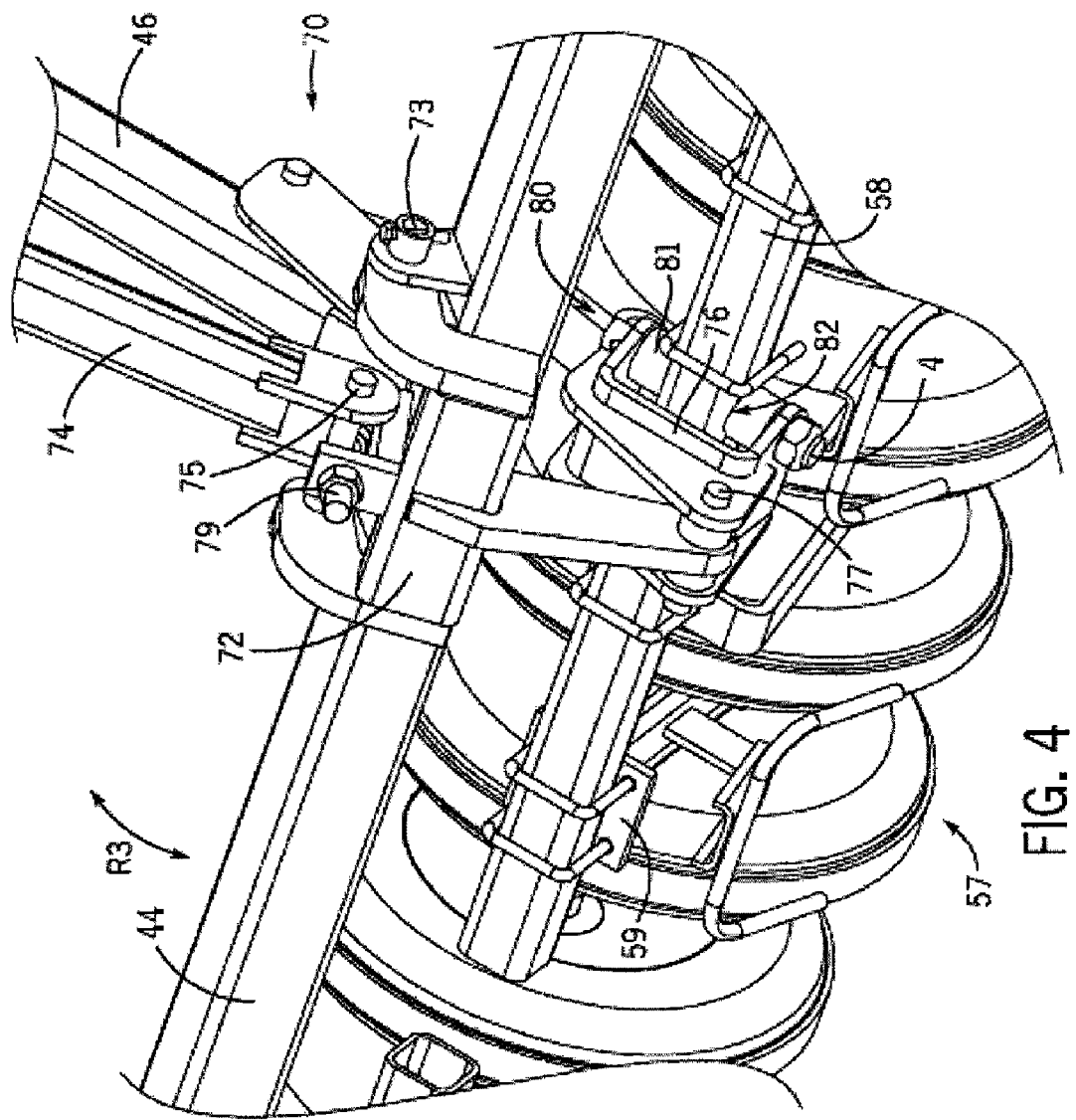
FIG. 4 is partial perspective view of a linkage assembly for mounting the inner press wheel gang to the rearward frame section of the frame of FIG. 2.
Figure 5:
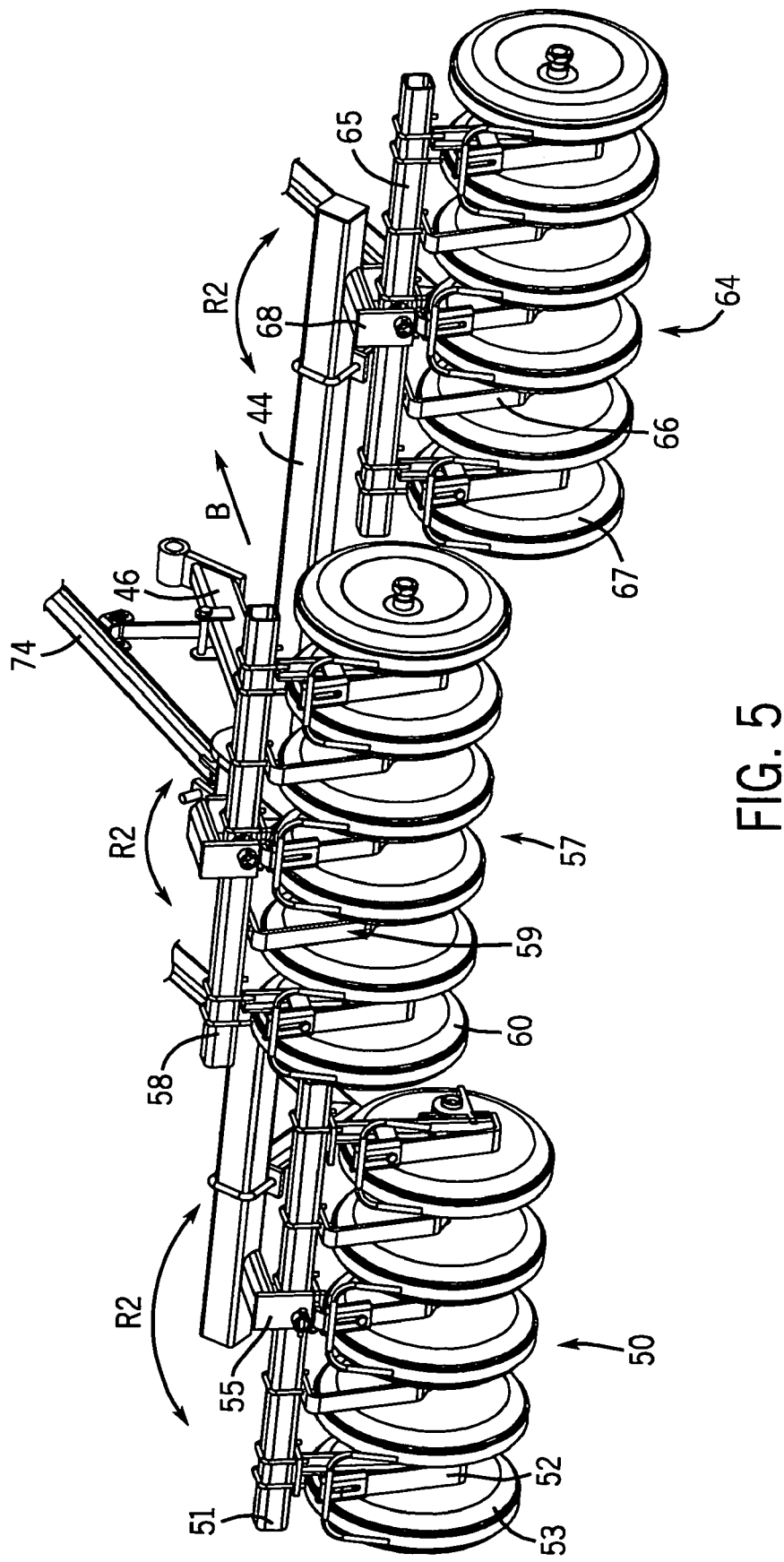
FIG. 5 is a partial top rear perspective view of the frame section of FIG. 2 with the inner press wheels in their uppermost vertical position and the outer press wheels in their lowermost vertical position.
Figure 6:
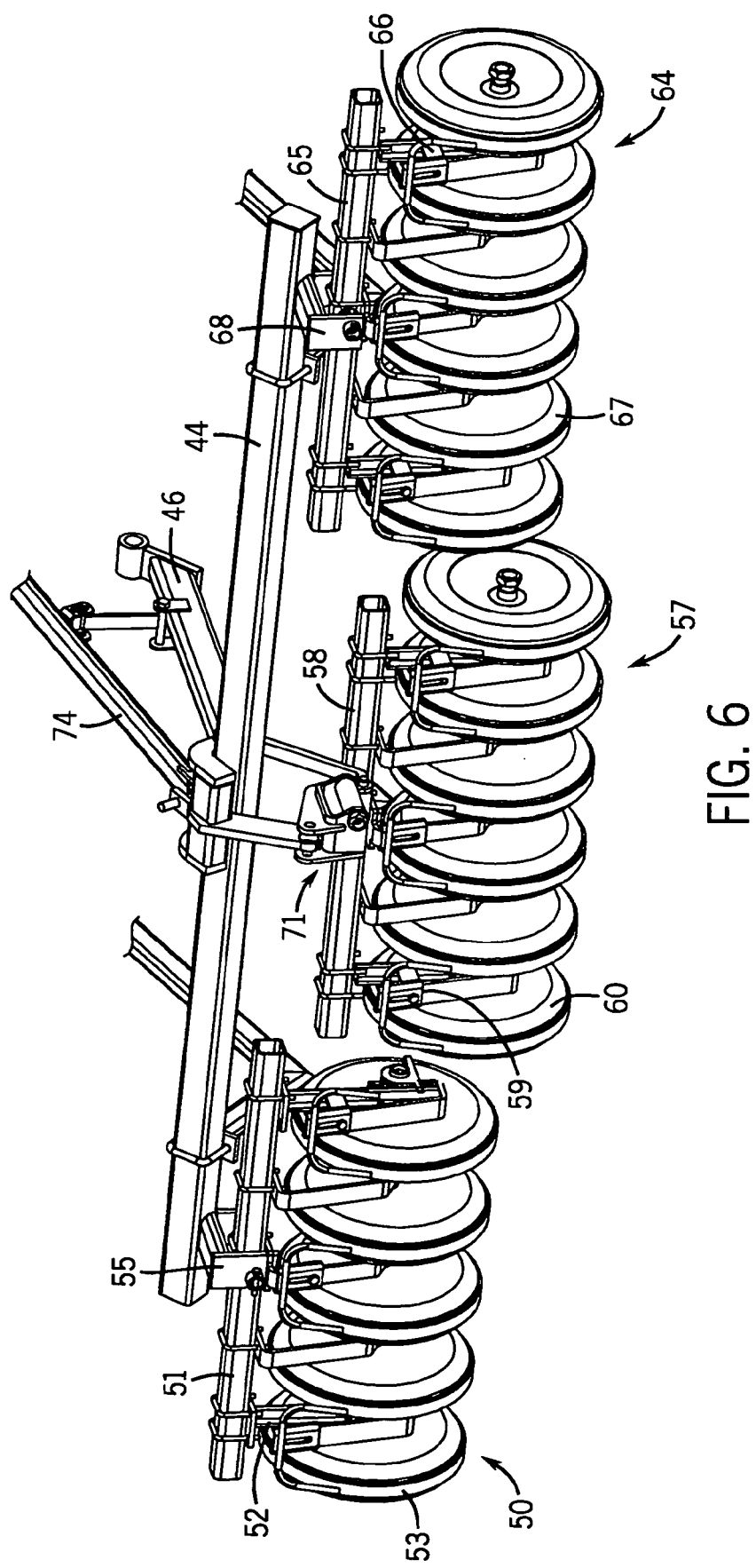
FIG. 6 is a partial top rear perspective view of the frame section of FIG. 2 with the inner press wheels in their lowermost vertical position and the outer press wheels in their uppermost vertical position.

Turning now to FIG. 4, there is shown a mechanism by which the middle press wheel gang 57 may move vertically in directions R3 in order to maintain contact with the soil, while maintaining its share of the total weight carried by the press wheels and cross bar 44. Specifically, there is provided a parallel arm linkage assembly indicated generally at 70. Weldment 72 is journalled to crossbar 44 with pins 73 (the left pin not being shown). Compression strut 74 applies pressure through pin 75, causing weldment 72 to rotate and apply downward pressure to packer mount journal housing 76 through pin 77. In journal housing 76, pin 80 mounts a sleeve 81 that is arranged in hole 82 in mounting arm 58. The distance between pin 73 and 75 centerlines can be varied by adjusting bolt 79, so that middle press wheel gang 57 can receive its correct share of the total packer load regardless of its width (at times it is not exactly ⅓ of the total press wheel set width, depending on spacing configurations). The relationship of the distance between pins 73 and 75 and pins 73 and 77 is such that the majority of the thrust load from strut 74 results in a vertical load on the press wheel frame, while a proportionate amount is applied the middle press wheel gang 57 throughout its allowed vertical travel. FIGS. 5 and 6 show the wheel gangs 50, 57 and 64 at their extremes of vertical travel.

Figure 7:
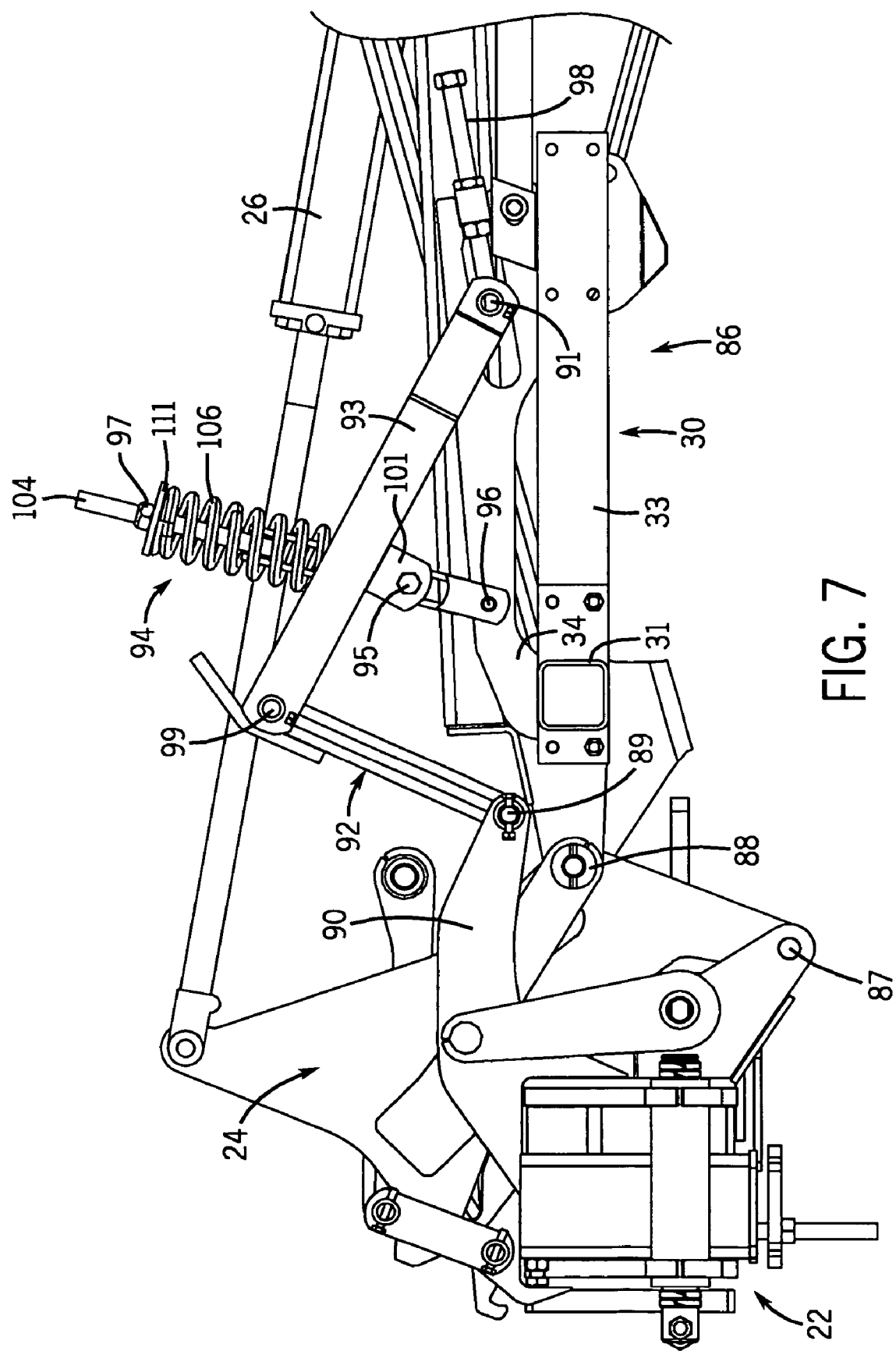
FIG. 7 is a view taken along lines 7-7 of FIG. 2 showing an adjustable tillage apparatus weight transfer device according to the invention in an upward position.
Figure 8:
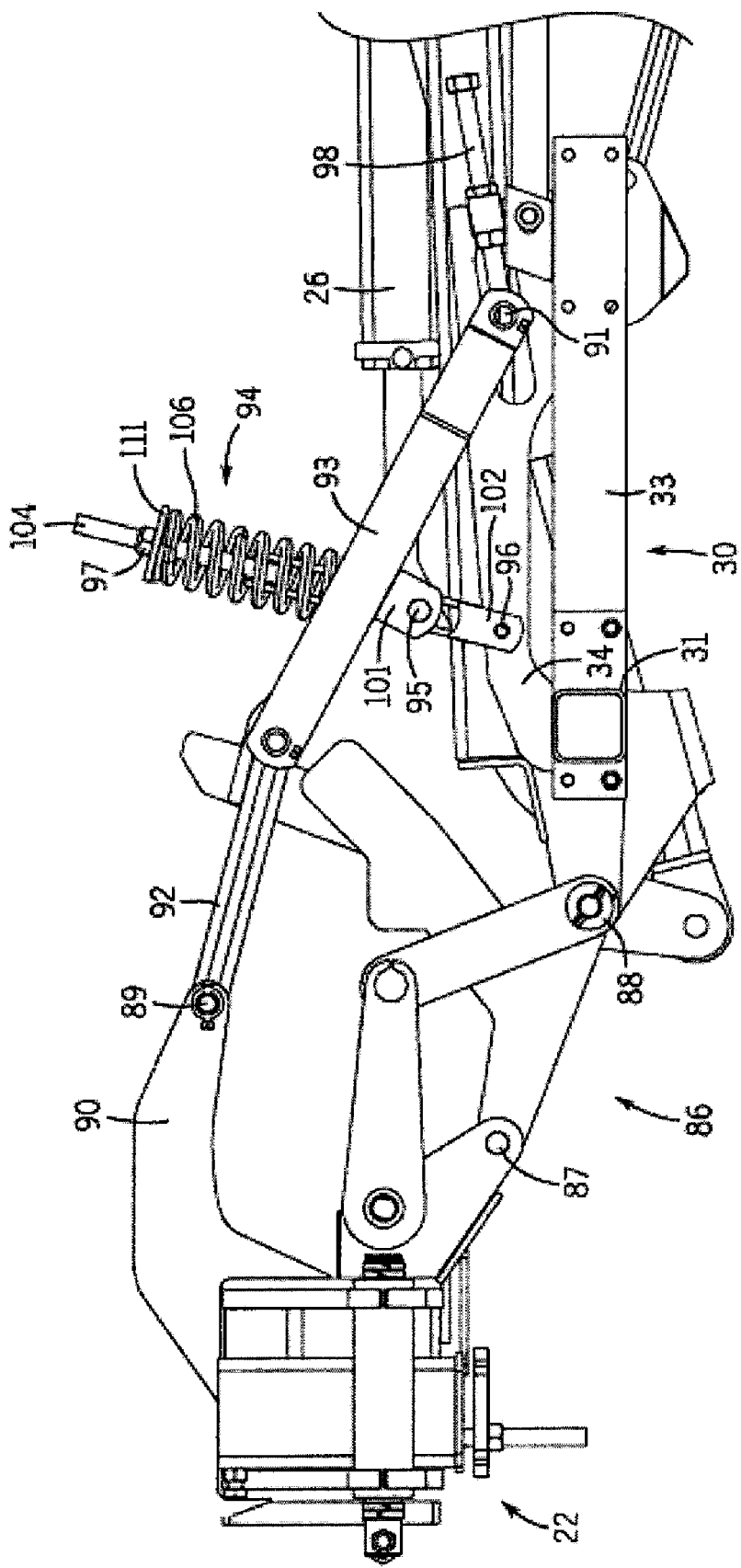
FIG. 8 is a view similar to FIG. 7 showing the adjustable tillage apparatus weight transfer device according to the invention in an lowered position.

A further feature of the apparatus 10 is the adjustable weight transfer device 86 shown in FIGS. 7 and 8. There is shown a side view of the support 33 and the front transverse tube 31 of the forward frame section 30, which is connected to the boom 22 by rockshaft 24. The rockshaft 24 is connected to the boom 22 at journal 87, and the forward frame section 30 is connected to the rockshaft 24 at journal 88, so retraction of the cylinder 26 results in lowering the forward frame section 30 from its upward position as shown in FIG. 7 to its working position as shown in FIG. 8.

The apparatus 10 has a heavy boom 22. At times, it is advantageous to apply heavy packing pressure to the press wheels 53, 60, 67, so the device 86 is used to transfer the weight of the boom 22 to the rear press wheel gangs 50, 57 and 64. This is done by creating a link that induces a high lateral force between journal 89 on boom flange 90 and pivot pin 91 that is connected to the forward frame section 30. As rockshaft 24 lowers forward frame section 30 to its working position, linkage 92 and linkage 93 approach but do not reach alignment.

A spring assembly 94, which serves as a biasing means and includes spring 106, is mounted at its lower end 102 by pin 96 to a lug 34 that is attached to the front transverse tube 31 of the forward frame section 30. Bolt 104 extends through the spring assembly 94. A flange 101 extends downward from linkage 93 and is journaled by pivot pin 95 to the lower end 102 of the spring assembly 94. The spring 106 exerts a growing pressure on linkage 93 by way of pivot pin 95 and flange 101 as rockshaft 24 lowers forward frame section 30 to its working position. This downward spring pressure translates to a high net lateral force through flange 90 and pivot pin 91. As a result, the left wing section 16 tries to rotate about journal 87 on the boom 22. This force in turn applies weight to the hitch of the tractor and to the press wheels 53, 60 and 67.

To adjust the amount of force, the length of spring 106 can be changed with adjustment nut 97 on top of compression plate 111, stopped bolt 98 can be adjusted, or the relationship of the linkages 92 and 93 can be lowered to close to parallel as this ratio determines the lateral force component. A stop is also provided to limit the linkage of going into a locking position as this could cause damage when the wing is raised out of working position. The linkage is arranged so that the force diminishes when raising the apparatus at headlands, going to zero when winging up for transports, and does not cause any extra loading on the rockshaft, while providing the operator with a range of adjustment to optimize the packing pressure of the apparatus.

Therefore, the present invention provides a tillage apparatus that provides improved frame flexibility such that the rear press wheels can more closely follow the contours of the ground, that provides improved weight distribution for the rear press wheels, and that provides adjustable weight transfer to the rear press wheels. The tillage apparatus thereby provides for more even seed insertion and soil compaction.

Although the present invention has been described in detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. An apparatus for tilling a field, the apparatus comprising:
a frame including a rearward frame section having a plurality of tillers;
said rearward frame includes a transverse tube and a rear transverse tube connected by supports;
a rigid continuous crossbar attached to the rearward frame section by first, second and third mounting bars, the rigid continuous crossbar having an axis in a direction of movement of the apparatus when tilling the field and having first and second portions that are stationary with respect to each other;
said rigid continuous crossbar having a lateral axis parallel and adjacent to the rear transverse tube; wherein the rearward frame section and said rigid continuous crossbar rotate about a horizontal fore-aft axis generally through a center of the frame;
a left and right outermost wheel support gang pivotably connected to the rigid continuous crossbar such that the outermost wheel support gang pivots with respect to the rigid continuous crossbar about an axis perpendicular to the rigid continuous crossbar;
a linkage assembly connected to the rearward frame section and to the rigid continuous crossbar inward from the left and right outermost wheel support gang;
an inner wheel support gang pivotably connected to the rigid continuous crossbar by a pivoting mounting bracket of the linkage assembly such that the inner wheel support gang pivots with respect to the rigid continuous crossbar about an axis perpendicular to the rigid continuous crossbar;
a first plurality of rotatable press wheels suspended from the inner wheel support gang;
a second plurality of rotatable press wheels suspended from the left outermost wheel support gang;
a third plurality of rotatable press wheels suspended from the right outermost wheel support gang;
wherein the press wheels of the left and right outermost wheel support gangs follow a contour of the field when the apparatus is pulled across the field; and
wherein the inner wheel support gang may be pivoted away or toward the direction of the axis of the rigid continuous crossbar such that the press wheels of the inner wheel support gang follow a contour of the field when the apparatus is pulled across the field.

2. The apparatus of claim 1 wherein:
the linkage assembly includes a compression strut connected to the mounting bracket and the rearward frame section,
the linkage assembly includes a frame arm connected to the mounting bracket below the compression strut and connected to the rearward frame section,
such that pivoting of the mounting bracket toward the direction of the axis of the crossbar vertically raises the inner wheel support gang and pivoting of the mounting bracket away from the direction of the axis of the crossbar vertically lowers the inner wheel support gang.

3. The apparatus of claim 2 wherein:
the mounting bracket includes means for adjusting the spacing between a junction of the compression strut and the mounting bracket and a junction of the frame arm and the mounting bracket thereby adjusting distribution of loads on the inner wheel support gang and the left and right outermost wheel support gangs when the apparatus is pulled across the field.

4. The apparatus of claim 1 wherein:
a pitch of the rearward frame section follows the contour of the field encountered by the press wheels of the left outermost wheel support gang and the press wheels of the right outermost wheel support gang when the apparatus is pulled across the field.

5. The apparatus of claim 4 wherein:
the linkage assembly includes a compression strut connected to the mounting bracket and the rearward frame section, the linkage assembly includes a frame arm connected to the mounting bracket below the compression strut and connected to the rearward frame section, wherein pivoting of the mounting bracket toward the direction of the axis of the crossbar vertically raises the inner wheel support gang and pivoting of the mounting bracket away from the direction of the axis of the crossbar vertically lowers the inner wheel support gang.

6. The apparatus of claim 5 wherein:

the mounting bracket includes means for adjusting the spacing between a junction of the compression strut and the mounting bracket and a junction of the frame arm and the mounting bracket thereby adjusting distribution of loads on the inner wheel support gang and the left outermost wheel support gang and the right outermost wheel support gang when the apparatus is pulled across the field.

7. The apparatus of claim 1 further comprising:

the linkage assembly including a first pin connecting the mounting bracket to a compression strut and the compression strut also being connected to the rearward frame section;

a first fitting connected to the rigid continuous crossbar, the first fitting having a second pin;

a second fitting connected to the inner wheel support gang, the second fitting having a third pin; and an adjustment mechanism configured to adjust a distance between at least two of the first pin, the second pin, and the third pin to thereby adjust a vertical position of the inner wheel support gang.

8. An apparatus for tilling a field, the apparatus comprising:

a boom, a central portion, a left wing portion and a right wing portion; wherein said left wing portion, central portion, and right wing portion are mounted to said boom with laterally spaced hinges; wherein the central portion, the left wing portion and the right wing portion move independently of each other;

wherein the central portion, the left wing portion and the right wing portion are not connected together and allowed to move independently of each other;

said left wing portion includes at least one frame;

said frame includes a forward frame section having a plurality of tillers and a rearward frame section having a plurality of tillers;

at least two rotatable land wheels are mounted under said boom;

said forward frame section includes a first transverse tube and a first rear transverse tube connected by first and second supports;

said rearward frame includes a second transverse tube and a second rear transverse tube having a first end, middle portion and end portion connected by third and fourth supports;

said rearward frame section attaches to said forward frame section by a first stabilizer link and a second stabilizer link;

a rigid continuous crossbar attaches to the rearward frame section; said crossbar having a lateral axis parallel and adjacent to the second rear transverse tube; wherein the rearward frame section and said rigid continuous crossbar rotate about a horizontal fore-aft axis generally through a center of the left frame;

a first journal at said middle portion of the second rear transverse tube attaches to said forward frame section; wherein the rearward frame section rotates with respect to said forward frame section in a radial direction;

a first, second and third mounting bar connected to the second rear transverse tube at said first end, middle portion and end portion respectively and to said rigid continuous crossbar in a parallel arrangement;

an inner wheel support gang mounted to the rigid continuous crossbar to pivot radially about a location on the inner wheel support gang and about an axis that is substantially parallel to the axis of the rigid continuous crossbar, wherein the inner wheel support gang is mounted to pivot independently of the pitch of the crossbar;

a left and right outermost wheel support gang pivots with respect to the crossbar about an axis perpendicular to the rigid continuous crossbar;

a first plurality of rotatable press wheels suspended from the inner wheel support gang;

a second plurality of rotatable press wheels suspended from the left outermost wheel support gang;

a third plurality of rotatable press wheels suspended from the right outermost wheel support gang;

a fitting connecting the forward frame section to the rearward frame section; and wherein the forward frame section has an axis in a direction of movement of the apparatus when tilling the field, the fitting allows the rearward frame section to pivot radially with respect to the axis of the forward frame section and to pivot independently of a pitch of the forward frame section.

9. The apparatus of claim 8 wherein:

the pitch of the rearward frame section follows a contour of the field encountered by the press wheels of the left and right outermost wheel support gangs when tilling the field.

10. The apparatus of claim 9 wherein:

the inner wheel support gang is attached to the crossbar between the left and right outermost support gangs.

11. The apparatus of claim 8 wherein:

the left wing portion includes a forward frame section having a plurality of tillers and a rearward frame section having a plurality of tillers, the right wing portion includes a forward frame section having a plurality of tillers and a rearward frame section having a plurality of tillers, the frame includes a rockshaft pivotably mounted to the boom, the left wing portion and the right wing portion of the forward frame section is attached to the rockshaft, the left wing portion and the right wing portion of the forward frame section is attached to the left wing portion and the right wing portion of the rearward frame section, respectively, and an actuator is connected to the rockshaft and the left wing portion and the right wing portion of the forward frame section such that movement of the actuator rotates the rockshaft thereby causing a vertical elevation change in the left wing portion and the right wing portion of the forward frame section and the left wing portion and the right wing portion of the rearward frame section.

12. The apparatus of claim 8 wherein:

the left wing portion includes a forward frame section having a plurality of tillers and a rearward frame section having a plurality of tillers, the right wing portion includes a forward frame section having a plurality of tillers and a rearward frame section having a plurality of tillers, the forward frame section of the left wing portion has an axis in a direction of movement of the apparatus when tilling the field and the rearward frame section of the left wing portion can pivot radially with respect to the axis of the forward frame section of the left wing portion, the forward frame section of the right wing portion has an axis in a direction of movement of the apparatus when tilling the field and the rearward frame section of the right wing portion can pivot radially with respect to the axis of the forward frame section of the right wing portion, a pitch of the forward frame section of the left wing portion follows a contour of the field encountered by the land wheels when tilling the field, a pitch of the forward frame section of the right wing portion follows the contour of the field encountered by the land wheels when tilling the field, a pitch of the rearward frame section of the left wing portion follows a contour of the field encountered by the press wheels mounted on each wheel support gang attached to the rearward frame section of the left wing portion when tilling the field, and a pitch of the rearward frame section of the right wing portion follows a contour of the field encountered by the press wheels mounted on each wheel support gang attached to the rearward frame section of the right wing portion when tilling the field.

13. The apparatus of claim 8 further comprising:

a pivoting mounting bracket attached to the first inner wheel support gang;

a linkage assembly connected to the rearward frame section and to the crossbar inward from the outermost wheel support gang, the linkage assembly including a first pin connecting the mounting bracket to a compression strut and the compression strut also being connected to the rearward frame section;

a first fitting connected to the crossbar, the first fitting having a second pin;

a second fitting connected to the first inner wheel support gang, the second fitting having a third pin; and an adjustment mechanism configured to adjust a distance between at least two of the first pin, the second pin, and the third pin to thereby adjust a vertical position of the first inner wheel support gang.

* * * * *